US006795009B2

(12) United States Patent
Duffy et al.

(10) Patent No.: US 6,795,009 B2
(45) Date of Patent: *Sep. 21, 2004

(54) SYSTEM AND METHOD FOR CURRENT HANDLING IN A DIGITALLY-CONTROLLED POWER CONVERTER

(75) Inventors: Thomas P. Duffy, Chandler, AZ (US); Malay Trivedi, Phoenix, AZ (US); Kevin Mori, Chandler, AZ (US)

(73) Assignee: Primarion, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/237,903

(22) Filed: Sep. 9, 2002

(65) Prior Publication Data

US 2004/0046535 A1 Mar. 11, 2004

(51) Int. Cl.[7] ............................................... H03M 1/12
(52) U.S. Cl. ...................... 341/155; 323/283; 327/538
(58) Field of Search .......................... 341/155; 327/538, 327/53; 323/283; 455/183.1, 574

(56) References Cited

U.S. PATENT DOCUMENTS 6,072,359 A * 6/2000 Brambilla et al. .......... 327/538
6,356,226 B1 * 3/2002 Lin ............................. 341/155
6,559,684 B2 * 5/2003 Goodfellow et al. .......... 327/53
6,563,294 B2 * 5/2003 Duffy et al. ................. 323/283

OTHER PUBLICATIONS

Duffy et al. (U.S. aplication No. 10/112,738), "System and method for highly phased power regulation", filing date Apr. 1, 2002.*
Goodfellow et al. (U.S. appplication No. 10/109,801), "System and method for highly phased power regulation using adaptive compensation control", filing date Mar. 29, 2002.*

* cited by examiner

Primary Examiner—Jean Bruner Jeanglaude
(74) Attorney, Agent, or Firm—Theodore E. Galanthay

(57) ABSTRACT

Currents flowing in the various channels within a voltage regulator module (VRM) are suitably converted to digital equivalents that can be processed to control each module in a modular power supply. Functions that may be digitally implemented include current balancing between channels, current sharing between various modules in a power supply, and/or the like. By monitoring the current provided on each channel within a module, for example, a controller can determine an average current for the channels, which in turn can be used to identify and compensate for over- or under-production in any particular channel. Active voltage positioning techniques and overload protection may also be implemented using digital techniques.

32 Claims, 7 Drawing Sheets

SYSTEM AND METHOD FOR CURRENT HANDLING IN A DIGITALLY-CONTROLLED POWER CONVERTER

FIELD OF INVENTION

This invention generally relates to techniques and devices for providing electrical power to electronic components. More particularly, various aspects of the invention relate to digitally controlling a modular power supply such as a power supply incorporating one or more voltage regulator modules.

BACKGROUND OF THE INVENTION

As electronic components become increasingly powerful, fast and complex, such devices require increasingly capable power supplies. Many devices such as microprocessors, microcontrollers and the like now demand that relatively high current levels be provided extremely efficiently and with very low fluctuations in current and voltage. Microprocessors such as those available from the Intel Corp. and Motorola Inc., for example, can demand a continuous supply of current in excess of 100 amperes at voltage levels below 2 volts.

Conventional power supplies for use in microprocessor systems typically include switched-mode power supplies such as voltage regulator modules (VRMs) or the like operating in a voltage-controlled mode. Each VRM typically controls a voltage across the output load using conventional feedback and compensation circuitry. In such embodiments, the voltage across the load is sensed and compared against a reference signal in the feedback path. The compensation circuitry then controls a gating signal that determines the output voltage as appropriate to provide electrical power to the load component.

To implement the power supply, a conventional VRM is frequently configured as a conventional step-down buck converter. A DC load line is often specified for microprocessor loads such that the output load voltage decreases with increasing load current. The scheme of dynamically adjusting the output voltage with load current is commonly referred to as active voltage positioning (AVP).

Conventional single-stage buck converters, however, typically do not provide adequate power for many applications due to thermal constraints and efficiency requirements. To overcome this issue, the power supply modules are typically configured as multi-phase converters such that several phase-separated buck channels operate in parallel within the VRM so that load current is appropriately distributed between the various stages. The multiple channels allow for multiphase switching within the power stage to reduce thermal stress, to reduce output ripple voltage and to improve the ability to finely control the electrical output characteristics of the module.

In cases where the current consumed by the load is higher than that provided by a single module, multiple modules may be connected in parallel to supply a greater amount of current. Two or more voltage regulator modules (VRMs) may be used to supply power to a conventional dual microprocessor chip set, for example. Modular power supplies typically exhibit the added benefits of redundancy and improved thermal response, as well as improved design flexibility.

To provide tight voltage regulation and to minimize thermal overstress, it is frequently desired to evenly balance the current provided between the individual channels of the VRM, as well as the current provided between parallel-connected VRMs. To balance the currents provided by the multiple modules and channels, some information about the currents provided within the system may be required. Several analog current sensing methods are known for conventional power supplies. Some exemplary current sensing schemes include: (i) measuring voltage across a sense resistor placed in series with the input voltage, (ii) measuring voltage across a low-side FET in a buck stage, (iii) measuring voltage across an output inductor, and (iv) using a current sense loop. Each of these schemes has drawbacks in the form of power loss, thermal drift, size and/or inaccuracy. Further, analog current sensing typically requires routing low magnitude current sense signals over a circuit board, which can be prone to noise pick-up because of the large-signal power stage activity. As a result, obtaining an accurate DC load line using analog controllers can be difficult in practice. An example of a conventional analog current management technique is shown in Intersil Technical Brief TB385 "Current Sharing Technique for VRMs" dated May 2000 and incorporated herein by reference.

Although various current control techniques have been attempted, none have effectively provided a reliable digital control technique suitable for next-generation modular power supplies. It is therefore desirable to produce a system and method for effectively managing and controlling currents provided in a modular power supply.

SUMMARY OF THE INVENTION

Systems, devices and methods for accomplishing a range of functions in a digitally controlled power converter are described. In an exemplary embodiment, currents flowing in the various channels are suitably converted to digital equivalents that can be processed to implement sharing between channels or between various modules. By monitoring the current provided on each channel, for example, a controller can determine an average current for the channels, which in turn can be used to identify and compensate for over- or under-production in any particular channel. Active voltage positioning techniques and overload protection may also be implemented using digital techniques.

According to a further exemplary embodiment incorporating inter-module current sharing, multiple voltage regulator modulators are suitably interconnected by a common $I_{SHARE}$ bus providing a density-modulated indication of the total amount of current being produced by the system. Each module provides a stream of pulses on the $I_{SHARE}$ bus such that the number of pulses provided within a set period of time is proportional to the total amount of current being produced by the module. By monitoring the total number of pulses present on the $I_{SHARE}$ bus, each module can become aware of the total amount of current produced within the system and can adjust its current output accordingly. Additionally, each module may incorporate active voltage positioning (AVP) techniques using digital feedback such that voltage and current are suitably controlled within each channel of each module.

Additional features of the present invention are brought out in the following detailed description of exemplary embodiments.

BRIEF DESCRIPTION OF THE DRAWING FIGURES

The various features and advantages are hereinafter described in the following detailed description of illustrative embodiments to be read in conjunction with the accompanying drawing figures, wherein like reference numerals are used to identify the same or similar parts in the similar views, and:

DETAILED DESCRIPTION OF EXEMPLARY EMBODIMENTS

The shortcomings of the prior art may be overcome by providing a digital control scheme suitable for implementation within a modular power supply. According to various embodiments, the currents provided by each channel are measured and converted to a digital representation that may be processed by a controller. The digital representations can be used to implement such functions as current balancing between channels, current sharing between modules, active voltage positioning, and/or overload protection to control the module's output electrical characteristics.

Figure 1:
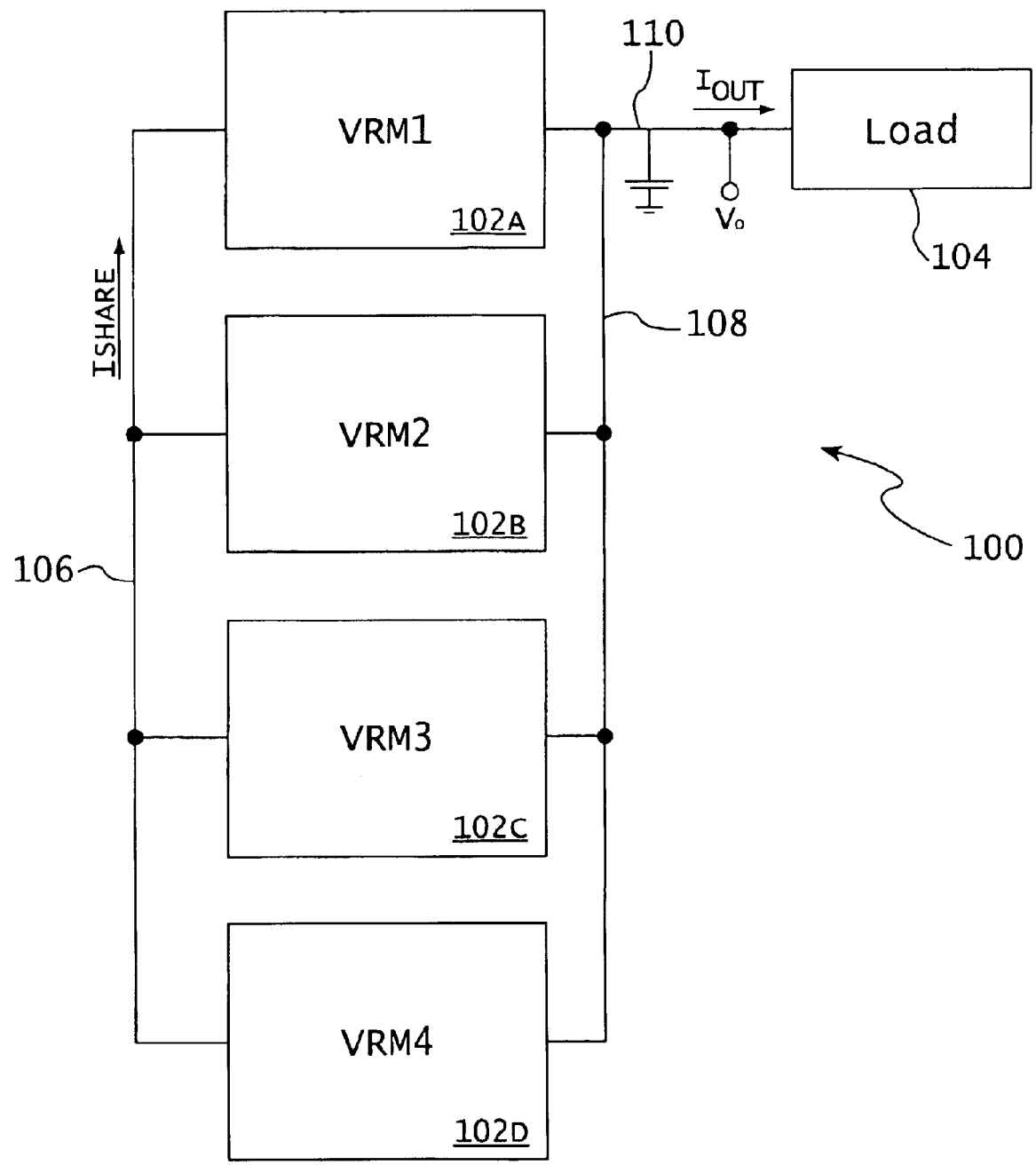
FIG. 1 is a block diagram of an exemplary power converter incorporating an exemplary current-sharing scheme.

FIG. 1 is a block diagram of an exemplary power supply featuring digital current control capabilities. With reference now to FIG. 1, an exemplary power supply 100 suitably includes one or more modules 102A–D connected by a current sharing bus $I_{SHARE}$ 106. Each module provides an electrical output having current and voltage characteristics to produce an output voltage $V_o$ and an output current $I_{OUT}$ to a load 104. The output of each module 102A–D may be coupled to load 104 via an output bus 108 to provide desired electrical characteristics (i.e., voltage and/or current) to load 104 as appropriate.

Each module 102A–D is any type of power supply or voltage regulator capable of producing desired electrical characteristics for load 104. Each module 102A–D may be, for example, a voltage regulator module (VRM) available from the Primarion Corp. of Tempe, Ariz., or the Intersil Corp. of Irvine, Calif. Any number of voltage regulator modules may be present in the various embodiments of the invention. Although four modules 102A–D are shown in FIG. 1, other embodiments may include as few as a single module 102 or as many as eight or more such individual modules (generically referred to as 102). The particular amount of current provided by system 100 is typically dictated by the needs of the particular load 104, which may be a microprocessor, microcontroller, or any other electronic component. Alternatively, system 100 may supply power to a multi-component network or system, such as a dual processor or other multi-processor computing environment. The various modules 102A–D may be coupled to load 104 according to any arrangement, architecture or technique. For example, the modules 102 may be coupled to multiple processor loads 104 through any conventional power distribution network. The modules may share a common output capacitor bank 110 or have individual capacitor banks within 102A–D.

Figure 2A:
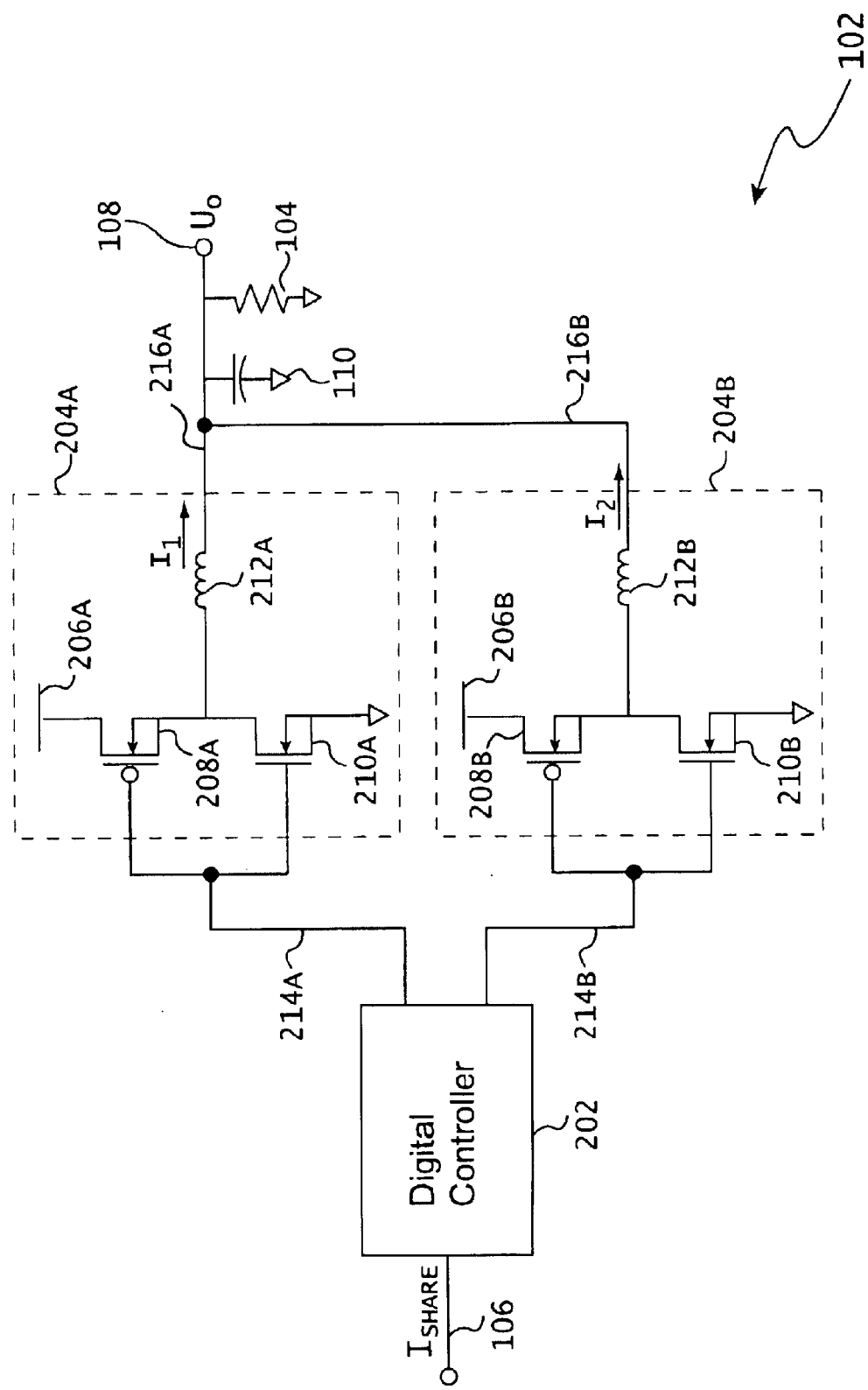
FIG. 2A is a circuit diagram of an exemplary voltage regulator module.

FIG. 2A is a circuit diagram of an exemplary module 102. With reference to FIG. 2A, an exemplary module 102 suitably includes a controller or other digital controller 202, a driver 204A–B for each current-providing channel within the module, and an appropriate output interface to load 104 such as power bus 108. While load 104 has been designated as a resistive load, those skilled in the art will know that typical loads are microprocessors, microcontrollers, or other electronic components; which may not always be purely resistive. In fact, the load 104 may be characterized as a rapidly switched variable resistor or multiple switched variable resistors. The demand at the load can vary from 0 Amps to 100 Amps or more and the rate of change in demand can be 1,000 Amps per microsecond or higher. Each current driver 204 for each buck channel suitably includes a voltage source 206 (such as 206A or 206B and one or more switches 208, 210 (such as 208A/210A or 208B/210B) configured to switch current from source 206 across a resistor, inductor or other output component 212 (such as 212A or 212B) to output 108. Switches 208 and 210 may be MOSFETs configured in any manner, as for example in CMOS technology, BICMOS technology, or may be implemented with any other switching devices such as a discrete P-FET/N-FET pair, switch, or the like. Optional capacitor bank 110 suitably serves as an output filter along with components 212A–B. The various circuit components shown may be implemented with conventional integrated circuit techniques and/or discrete components or the like.

Each module 102 incorporates multiple drivers, such as the two current-providing channels 204A–B, as appropriate. Although two channels are shown, such embodiments may include two, four, six, eight or any other number of channels depending on the load current requirements, individual channel capacities, and other design variables. In operation, each channel 204A–B suitably operates by switchably connecting output line 216 to a voltage source 206 or to ground such that a desired amount of current is provided on output line 216. By controlling the relative amounts of time that output line 216 is electrically coupled to voltage source 206 and/or to ground, the total current provided by the channel is appropriately regulated. Switching may be provided by digital controller 202 using, for example, pulse width modulated (PWM) signals on an input line 214 (such as 214A and 214B) to switches 208 and 210. By varying the duty cycle of the control signals provided on signal line 214A, digital controller 202 suitably controls the amount of time that voltage source 206A is coupled to output line 216A. In the embodiment shown in FIG. 2A, switch 208 is a MOSFET with an inverting input such that only one of switch 208 or switch 210 are activated at any particular time. By providing appropriate logic signal to the gate drive line 214A, switch 208A is suitably turned off and switch 210A is turned on, for example, such that output 216A is connected to ground and the current drawn from input 206 is discontinued. This implementation may be replicated to any number of channels 204. Digital controller 202, then, produces output signals 214 to each channel 204 based upon the need for voltage and current at output 108. This need may be determined based upon a number of factors, including the output desired on signal line 108, or by signals provided on $I_{SHARE}$ input 106. As explained more fully below, a density-modulated pulse stream on $I_{SHARE}$ bus 106 may be used to provide an indication to digital controller 202 of the total amount of current flowing within system 100 (FIG. 1) or within any particular module 102.

Digital controller 202 may be implemented with any controller, microprocessor, digital signal processor, microcontroller, programmable logic device, application specific integrated circuit (ASIC) or other processing device. In an exemplary embodiment, digital controller 202 includes a suitable processor and associated digital memory for storing data and executable instructions. Suitable processors include the model 68HC05 microcontroller available from Motorola Inc. of Schaumburg, Ill. or any processor available from the Intel Corp. of Santa Clara, Calif., the Texas Instruments Corp. of Richardson, Tex., or any other supplier. In various embodiments digital controller 202 suitably provides digital control signals on signal lines 214A–B based upon data received from $I_{SHARE}$ bus 106 (FIG. 1), currents sensed in each channel 204A–B and the sensed output voltage across load 104 as described more fully below.

Figure 2B:
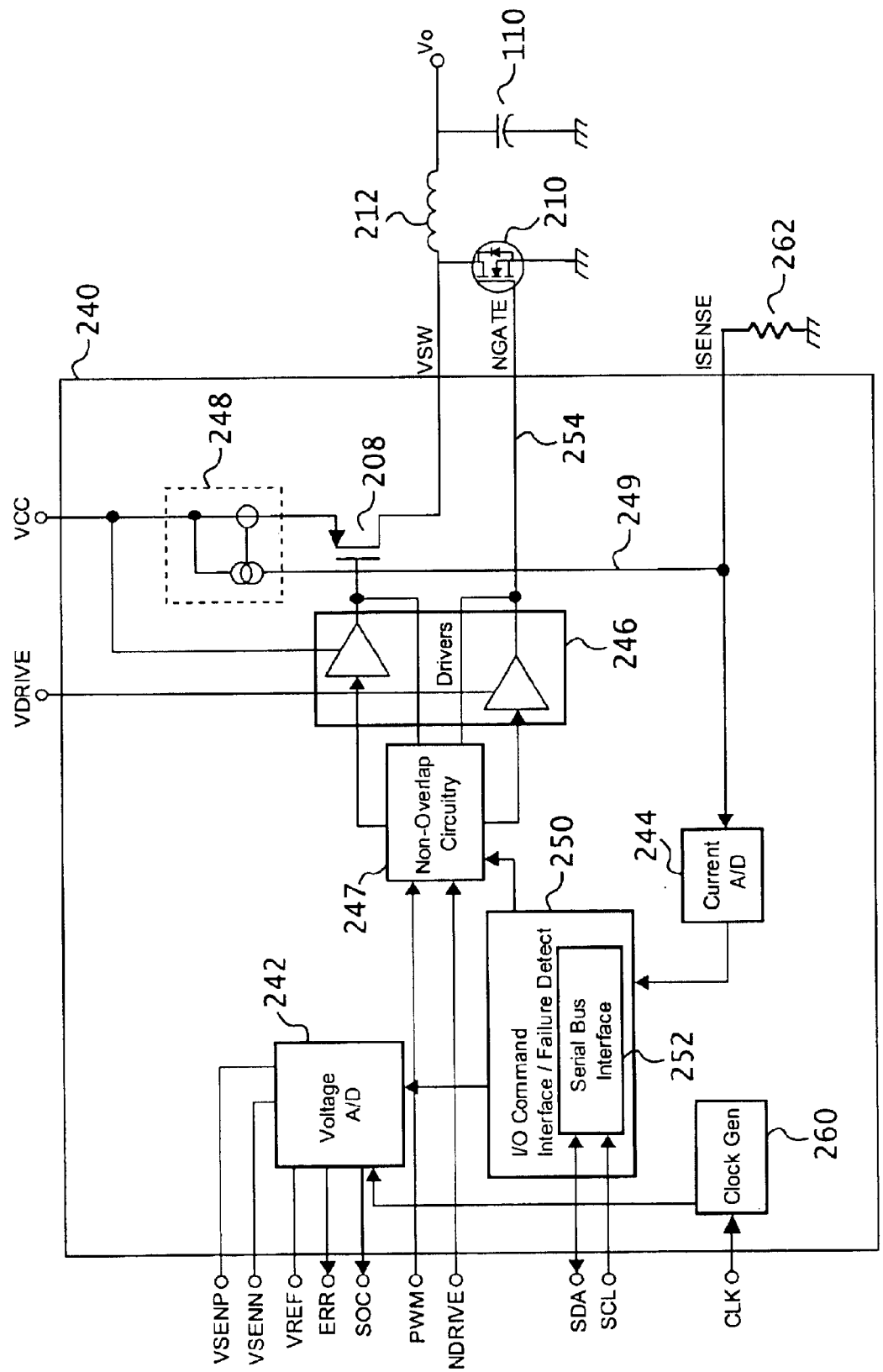
FIG. 2B is a block diagram of an exemplary power integrated circuit that provides current sensing functionality.

With reference to FIG. 2B, an exemplary integrated circuit implementation one channel portion of one VRM is shown. Power IC 240 is configured with a current mirror 248 to sense the current flowing through the high-side FET 208 of each channel. Current mirror 248 receives a voltage $V_{cc}$; which can be relatively high (e.g. 12 Volts) for providing substantially high power on output line VSW. Driver 246 receives a lower voltage $V_{drive}$ (e.g. 6 volts) at the lower of the two drivers (as shown) to save power in the operation of the lower driver. However, the upper driver in 246 receives $V_{cc}$ in order to provide the appropriate drive voltage to turn on upper FET 208. These voltages are exemplary, although $V_{cc}$ will typically be larger than $V_{drive}$. High-side FET 208 may be integrated into a power IC along with gate drive circuitry 246 (shown containing two drivers) and non-overlap circuitry 247, voltage A/D converter 242 and current A/D converter 244, as well as an optional I/O interface 250 for digitally communicating with the external world via a serial or parallel bus interface 252. Serial bus interface 252 receives a serial clock input (SCL) and receives as well as sends serial data via terminal SDA. The drivers in gate drive circuitry 246 are amplifying buffers providing inputs to high side FET 208 and low side FET 210, as shown. The details of an exemplary Power IC 240 are described in U.S. patent application Ser. No. 09/978,125 "System and Method for Highly Phased Power Regulation" filed on Oct. 10, 2001 and are incorporated herein by reference. Power IC 240 may be connected to an external low-side FET 210 and inductor 212 to form the buck channel providing a switched output on line VSW. Power IC 240 also provides a gate signal on line 254 to the low-side FET 210 as appropriate. Temperature sensing and current limiting functionality may also be included in some embodiments.

Figure 3A:
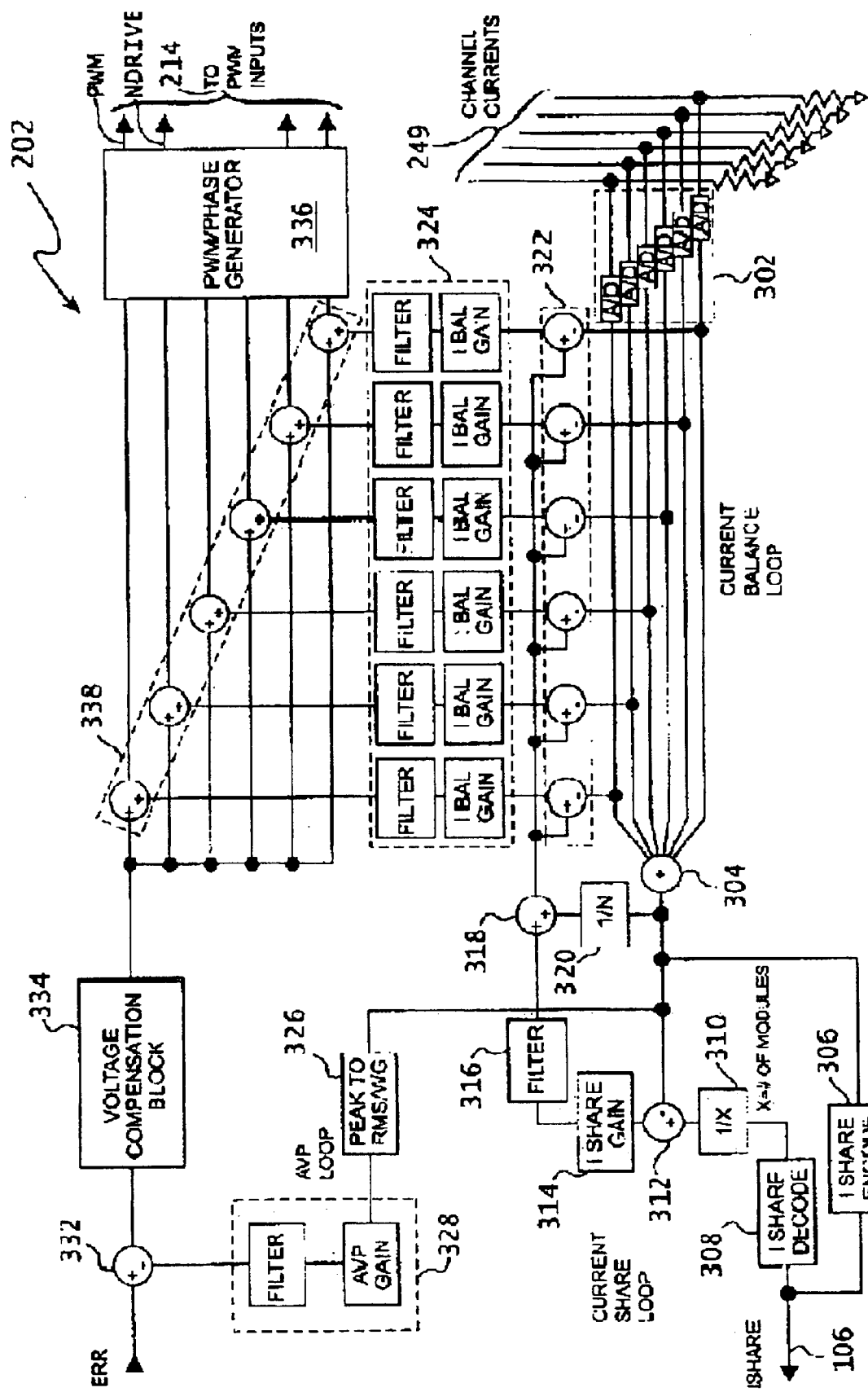
FIG. 3A is a block diagram of an exemplary voltage regulator module incorporating digital current control.

Clock generator 260 receives an input signal on terminal CLK and generates synchronizing signals to A/D Converter 242 so that incoming sampled signals VSENN and VSENP are converted to a digital stream. VSENN and VSENP are differential analog sense voltages. These voltages are sensed at the load, sensing the high (VSENP) and low (VSENN) level terminals there. A/D Converter 242 also receives a reference voltage ($V_{ref}$) and provides an error signal (ERR) to block 332 (FIG. 3A). Start of clock (SOC) is a synchronizing clock signal indicating the start of time when data comes in. The PWM and NDRIVE signals are further provided by the PWM generator.

In one embodiment, the current through high-side FET 208 typically exhibits a trapezoidal waveform with a maximum value per cycle just before FET 208 is turned off. The sensed current appearing at the $I_{SENSE}$ line 249 in FIG. 2B is typically a very small fraction of the actual current (e.g. on the order of about 1:10,000) through the power stage, and may be detected as a voltage across a burden resistor 262. An analog-to-digital converter 244 then samples and converts the current into an equivalent digital form such as an eight or sixteen bit representation of the current. In an exemplary implementation, A/D converter 244 samples the peak high-side FET current per cycle to provide instantaneous current information. In another implementation, the voltage across the burden resistor 262 is filtered such that the A/D converter samples the average channel current. Average current information, however, may not be suitable for embodiments using fast transients. In the exemplary converter of FIG. 2B, the high-side FET 208, the current mirror 248 (used as a current sense circuit) and the A/D converter 244 are implemented within one integrated circuit to reduce noise pick-up that would otherwise be caused by relatively long routing lines. The integrated circuit approach also allows for thermal compensation using conventional techniques. An example of a highly accurate, lossless and thermally insensitive current sensing technique is described in U.S. patent application Ser. No. 09/978,296, "System and Method for Current Sensing" filed on Oct. 15, 2001 and incorporated herein by reference, although any sampling technique and/or analog-to-digital converter could be used in alternate embodiments.

Figure 2C:
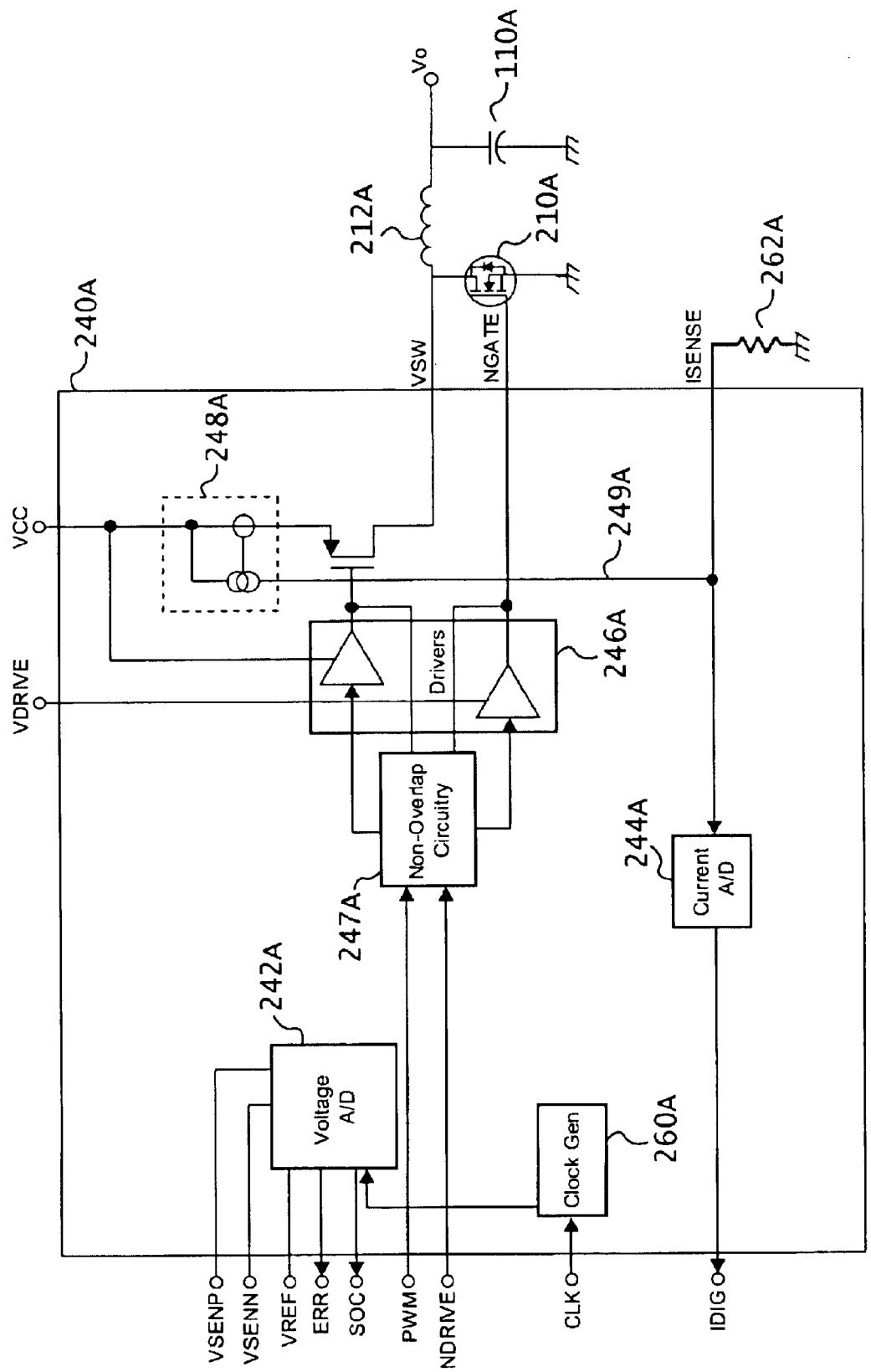
FIG. 2C is a block diagram of an another exemplary power integrated circuit that provides current sensing functionality.

FIG. 2C shows an alternative embodiment of a Power IC. The structure and operation is substantially similar to FIG. 2B and therefore corresponding elements have been identified with corresponding reference numerals with the suffix "A". The structural difference between the FIG. 2B and FIG. 2C embodiments is that in FIG. 2C, blocks 250 and 252, have been eliminated. Current A/D converter 244 sends digital signals representing the peak current through the high side FET (e.g. 208 in FIG. 2B, 208A in FIG. 2C) directly by way of dedicated line IDIG to the digital controller 202, instead of through interface 250, as in FIG. 2B. Also, in the embodiment of FIGS. 2B and 2C, non-overlap circuitry 247 could be optionally eliminated as this function could be alternatively performed by the digital controller 202.

FIG. 3A is block diagram of an exemplary digital processing technique that may be implemented within a modular power supply. Digital processing may include various functions such as current balancing, current sharing, active voltage positioning, and overload protection. Many of the various modules and components shown within the figure are logical components that may be implemented using software routines executing on a digital controller or processor (such as digital controller 202 described above). Accordingly, many of the components shown in FIG. 3A may not be physically present or may be altered substantially within various practical embodiments.

With reference now to FIG. 3A, an exemplary digital controller 202 suitably includes an analog-to-digital stage 302 (each of the A/D converters in the block 302 corresponds to the current A/D converter 244 in FIG. 2B and 244A in FIG. 2C), an $I_{share}$ encode module 306, an $I_{share}$ decode module 308, and various signal processing modules for shaping and processing the current flowing in each channel. Digital controller 202 may also provide active voltage positioning (AVP) using a peak-to-average converter 326, a shaping filter 328 and a voltage compensation block 334. The outputs of the active voltage positioning (AVP) loop and a current balancing path may be combined and provided to a signal generator 336 that is capable of producing pulse-width-modulation inputs 214 to each channel 204 (FIG. 2A), as appropriate. PWM/Phase generator 336 is shown with six channel inputs that provide six pairs of outputs (PWM and NDRIVE) to the non-overlap circuitry 247 in FIGS. 2B and 2C. Other numbers of channels and inputs could be provided in alternate embodiments.

Currents flowing within each channel 249 (corresponding to line 249 in FIG. 2B) are sampled and/or converted to digital representations of the channel currents using one or more analog-to-digital (A/D) converters 244 in the block 302 as discussed above in conjunction with FIG. 2B. In contrast to conventional analog signals, digital signals are substantially immune to noise and thermal drift, and can therefore provide a highly accurate representation of the current in each channel. The digital representations of the currents may further be manipulated in serial or parallel by a conventional digital controller 202 or other device to implement AVP, current balancing, current sharing and other functions. Currents sampled in the various embodiments may be peak currents, average currents, RMS currents, or any other form.

Figure 3B:
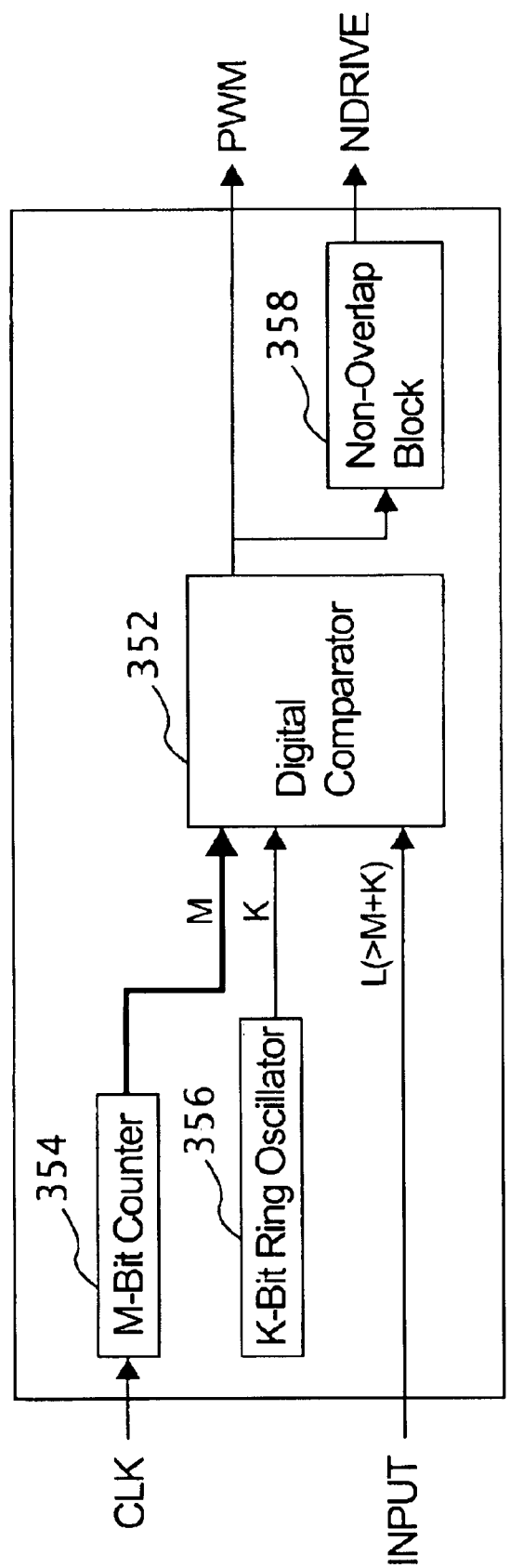
FIG. 3B is an exemplary PWM signal generator.

Refer now to FIG. 3B for a description of the PWM/phase generator 336 of FIG. 3A. Digital comparator 352 receives M signals from M-bit counter 354 and K signals from K-bit sub-scale counter 356. Comparator 352 also receives input signals from each of the amplifiers 324 (FIG. 3A) as combined in 338 with a signal from the voltage compensation block 334. The number of bits provided by the input signals L should be greater than the sum of the bits provided by the M and K signals. The digital comparator provides an appropriate signal to the PWM and NDRIVE inputs of the Power IC 240/240A, as illustrated in FIGS. 2B and 2C, respectively. In the current example, there are six of the FIG. 3B block diagrams incorporated in the PWM generator of FIG. 3A. Also, in the current example, Digital Comparator provides the NDRIVE signal through non-overlap block 358. The optional non-overlap block 358 in the PWM generator 336 creates an NDRIVE signal that is complementary to the PWM signal with a non-overlap time between the two signals. When the non-overlap block 358 is in generator 336, then blocks 247 and 247A in FIGS. 2B and 2C may be optionally eliminated.

The PWM generator 336 generates N complementary PWM and low-side drive (NDRIVE) outputs to each of the N Power IC's in the VRM. The PWM signal is driven to the high side drive of the Power IC. A positive level on the PWM signal enables the high side switch of the Power IC. The NDRIVE signal is driven to the low side drive of the power stage. A positive level on the NDRIVE signal enables the low side switch of the power stage. The rising edge of each PWM signal is evenly distributed in time over the switching period. Alternatively, the phases may also be staggered. When a particular PWM signal is about to be outputted, the PWM generator samples the output value of the current from block 338 and generates a pulse that has a width proportional to the output value. The proportionality between the output value and the PWM pulse width is denoted by the granularity of the pulse width. Specifically, the M-bit counter 354 is reset at the beginning of each PWM pulse. As the counter counts up the clock rate, its value is compared with the input to the PWM generator. The clock rate determines the resolution of the PWM pulse width.

Current Balancing

Knowledge of the instantaneous current through individual channels suitably enables digital controller 202 to accomplish current balancing between the channels, which may be beneficial to improve thermal handling and the like. In one embodiment of a current balancing scheme, the current produced by each channel is adjusted according to the channel current's variance from an average channel current. Average channel current is readily computed from the digital representations of the channel currents by summing the digital representations in summing block 304 and dividing by the number of channels in dividing block 320, or by any other technique. For a module with N channels, for example, the output of summing block 304 is divided by N (block 320) to determine the average value of the peak current through all the channels. The difference between the individual channel current and the average current suitably yields the amount of current deviation for each channel. The calculated deviations may be band limited and/or amplified as appropriate by processing blocks 324. The current compensation for each channel may then be added to the output of voltage compensation module 334 (discussed below) to obtain a corrected compensator signal that may be provided to a pulse width modulation/phase generator 336, which suitably generates a control signal for each channel as a function of the compensator signal. Accordingly, when a channel current is observed to be less than the average current, the duty cycle for that channel may be expanded to increase the current level such that the deviation is reduced. Conversely, the duty cycle may be decreased when the channel current is observed to be greater than the average current. Accordingly, digital current balancing maintains current stability in steady state and improves rapid settling of channel currents following load transient.

Current Sharing

In an exemplary current sharing scheme, a digital representation of the current provided by each voltage regulator module 102 is provided to other voltage regulator modules communicating via a common bus ($I_{SHARE}$) such that the current provided by each voltage regulator module 102 can be appropriately balanced. In such embodiments, each module 102 transmits a density-modulated signal (such as a stream of pulses) representing the current produced by that module on the common bus. Each module 102 simultaneously monitors the bus to receive density-modulated signals provided by other modules. The total number of signals (e.g. pulses) observed during a pre-determined period of time, then, is indicative of the total amount of current being produced by a system. If each module 102 knows the total amount of current produced by all modules in the system and the number of modules in the system, then an average current can be readily computed and the module output can be compensated to adjust for over- or under-supply of current.

With continued reference to FIG. 3A, digital representations of channel currents are added together at summing block 304 and suitably encoded (block 306) for transmission within $I_{SHARE}$ bus 106. Encoding takes place according to any scheme, such as density modulation. In an exemplary embodiment, the total amount of current present within each module 102 is provided to encode module 306 which translates the digital representation of the current into a stream of pulses that is provided on $I_{SHARE}$ bus 106. Each pulse may represent a predetermined amount of the current (such as 250 mA, or any other amount). In such a scheme, if a total of 5A is measured across the various channels, for example, then encode module 306 suitably produces twenty pulses on $I_{SHARE}$ bus 106 within a predetermined period of time as described more fully below. This pulse train may be repeated after the predetermined period of time has elapsed, or as new data becomes available at encode module 306.

With momentary reference again to FIG. 1, as each voltage regulator module 102 produces a stream of pulses on $I_{SHARE}$ bus 106, the total number of pulses on the bus is correspondingly proportional to the total amount of current produced by the modules 102A–D at any given time. By counting the number of pulses present on the $I_{SHARE}$ bus 106, then, each module 102 suitably determines the total amount of current produced by system 100 and may therefore adjust its output accordingly to conform to an average current produced by each module. Counting of pulses may be accomplished with an edge-triggered counter monitoring $I_{SHARE}$ bus 106, or by any other counter or technique.

With reference again to FIG. 3A, decode module 308 suitably monitors the density of pulses on $I_{SHARE}$ bus 106 and provides an indication of the total current to digital controller 202. The total current in the system may then be divided by the number of modules (step or block 310) to determine an average amount of current per module as reported on the $I_{SHARE}$ bus. The number of modules in the system 100 (FIG. 1) may be "hard coded" into each digital controller 202, or may be determined in operation using the techniques described more fully below. By determining a difference 312 between the average current within the system at 310 and the total present current at 304 produced by that particular module 102, digital controller 202 suitably determines an amount of adjustment to be made to compensate for any over or under production of current within the module 102. This difference at 312 may be amplified ($I_{SHARE}$ gain block 314) and filtered (step or block 316) as appropriate. The total current within the block 304 is then divided at 320 by the number of channels (N) to determine an average channel current within the voltage regulator module. This average channel current may be added (step or block 318) to the average module current from block 312 (coupled to 318 through blocks 314 and 316) to implement a combined current sharing/current balancing technique. This combined average may then be compared at blocks 322 with the amount of current processed within each channel to determine whether that particular channel is over- or under-producing at any instant moment. These comparisons may be amplified and filtered (step or blocks 324) as appropriate and provided to phase generator 336 to adjust the duty cycle of inputs provided on signal lines 214 to the switches for each channel so that the amount of current may be increased or reduced as appropriate.

Active Voltage Positioning

The current within a voltage regulator module 102 may alternatively or additionally be processed using active voltage positioning (AVP) techniques to further adjust the individual channel characteristics. In such embodiments, the peak currents identified within the channel are converted to RMS or average values, as appropriate, and compared at 332 to an error signal ERR to determine a desired output to PWM generator 336. This signal may be combined at 338 with the current balancing indications at 322 prior to being provided to phase generator 336 as appropriate. According to conventional active voltage positioning techniques, the output voltage of each voltage regulator module 102 may be set slightly lower than normal to compensate for high loads; similarly, the voltage may be set higher than normal to compensate for reduced loads. AVP techniques are typically used to minimize voltage deviation during a load step so that deviations in peak-to-peak output voltage are reduced without requiring increased output filter capacitance. AVP may also result in reductions in CPU power dissipation. An exemplary implementation of active voltage positioning may be shown in, for example, Linear Technology Design Note 224 "Active Voltage Positioning Reduces Output Capacitors" dated November 1999 and incorporated herein by reference. AVP techniques are also referred to as "adaptive voltage processing".

To implement AVP techniques, voltage compensator 334 suitably provides a control signal to PWM generator 336 to maintain the input signal to compensation block 334 at a desired operating point (e.g. at zero). An externally-provided digital error signal ERR represents the difference between the sensed output voltage from module 102 and a reference voltage. In order to satisfy the DC load line, the voltage signal output from module 102 is suitably adjusted by shifting the error voltage ERR by an amount proportional to the sensed load current. The overall load current is obtained by adding the digital current representations obtained from individual channels using the summation block 304, as appropriate. If the individually sensed currents represent average currents per channel, then the output of adder 304 represents the average load current. In another exemplary implementation whereby the sensed currents represent peak currents for each channel, the output of adder 304 may be converted from peak to average form using peak-to-average converter 326 or another appropriate scaling technique. Converter 326 offsets the output of the adder 304 by an appropriate amount. A unique relation can be established between the peak current and the average current based upon known information about input voltage, output voltage, and output inductance of the power stage. The corrected signal may then be passed through an AVP gain stage 328 to obtain the precise amount of offset to the ERR signal. The amplified signal may also be filtered to impose a band limit and to reduce noise sensitivity. Quantization noise introduced by digital controller 202 is suitably related to the bit resolution of the sampled channel currents, and is reduced with higher bit count. This scheme thus provides accurate offsets to the ERR signal.

Availability of digital information about the various channel currents allows additional control features to be built into a digital controller 202. For example, overload protection may be implemented by tracking the observed channel currents to determine if a fault has occurred. Faults may be identified, for example, if a peak current through an individual channel exceeds a programmable threshold level for a specified time interval. Digital controller 202 can then disable or shut down the channel (or the entire system, as described more fully below) if an overload condition is detected in one or more channels, as described more fully below.

It will be appreciated that the various logical components and modules shown within FIG. 3A are shown to aid in understanding the various features of the invention, and that each block may not be present in all actual embodiments. Many embodiments, for example, will be implemented using software processes, logic routines, or the like that may not include each processing block shown in FIG. 3A, or that may combine multiple blocks into single processing steps. The optional shaping filters and amplifiers 324 shown within FIG. 3A, for example, may not be required in all embodiments, nor may a signal filter 328 be required in all embodiments. Similarly the various signals may be combined, averaged, and otherwise processed according to any conventional signal-processing technique and the invention should not be limited to the exemplary techniques described herein.

Figure 4:
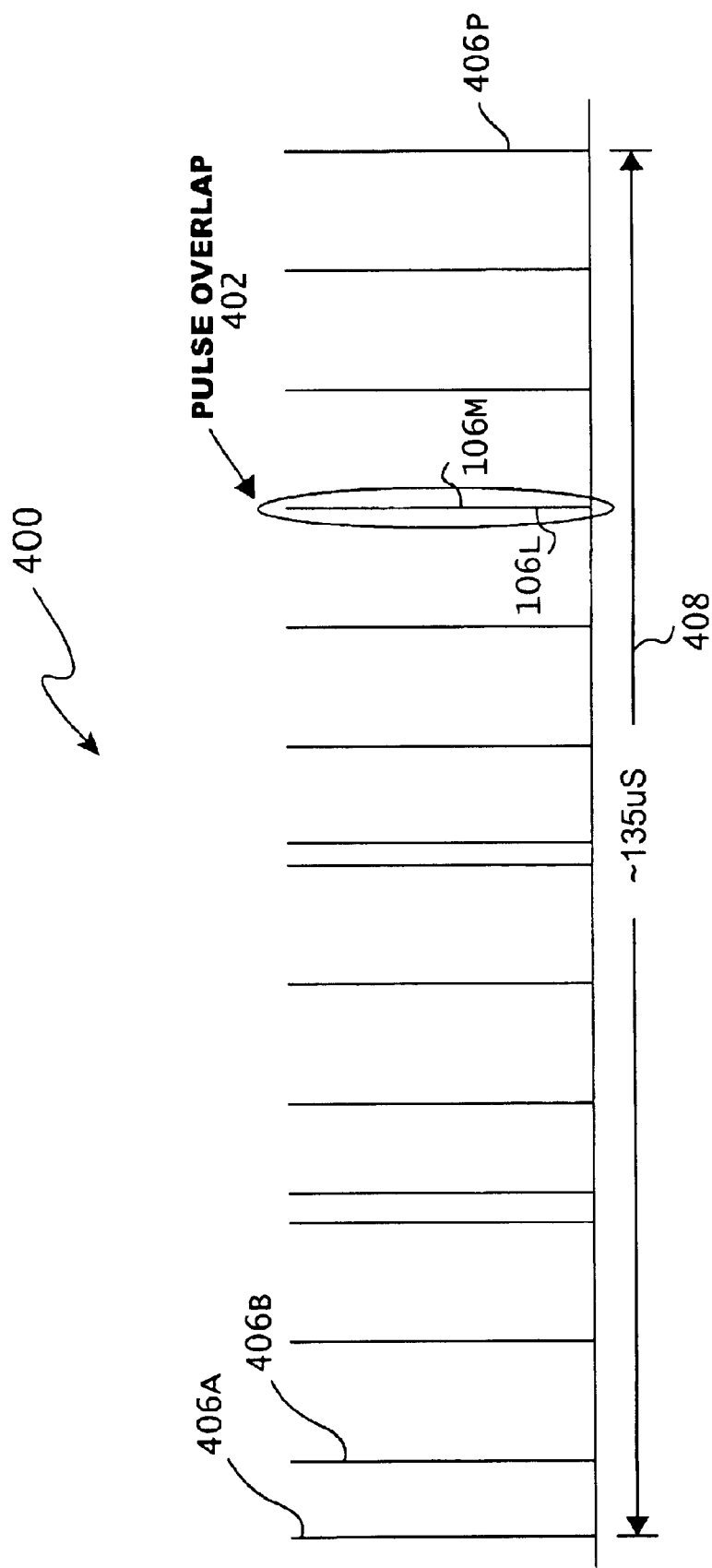
FIG. 4 is a timing diagram of an exemplary pulse density modulation scheme.

FIG. 4 is a timing diagram of an exemplary current density modulation scheme suitable for use with a current sharing scheme using a common $I_{SHARE}$ bus.

With-reference now to FIG. 4, a stream of pulses 406a–p are shown within a predetermined time slot 408 of about 135 microseconds. Of course, the actual predetermined time 408 is a matter of design choice and may be any value from about a few microseconds to a second or more. In the embodiments shown in FIG. 4, sixteen pulses 406A–P are shown within the predetermined time period 408. Pulses 406L and 406M, however, overlap at a common period of time such that the two pulses are relatively indistinguishable from each other. Accordingly, an edge-triggered counter may sense only fifteen pulses present within pulse train 400. In a scheme wherein each pulse represents 250 mA, for example, pulse train 400 would represent 4 A of current within a system 100 (FIG. 1). Because pulses 406L and 406M overlap, however, many modules 102 may identify the total current within time frame 408 as 3.75 A.

To overcome the issue of overlapping pulses, a number of solutions may be implemented. A collision-detect scheme such as the collision detect used by conventional ETHERNET networks, for example, may be implemented. In much simpler embodiments, however, the affects of pulse overlap may be greatly reduced by adjusting the width of the pulses with respect to the predetermined time 408. In a system with "A" modules, for example, wherein "P" represents the width of each pulse as determined by the clock frequency (e.g. 150 MHz) and the separation between two successive pulses issued by a particular module is represented by "$T_p$", then the probability of a given time instant lying within the pulse of the module is $P/T_p$. For a second module, given a first pulse, the probability of the second pulse overlapping the first pulse is $(P+2P)/T_p$. Hence the probability of overlap between the two pulses is $4P/T_p$. In general, the probability of overlap between at least two pulses may be approximated by $2AP/T_p$, the permissible probability of error (E) within the system then, may be represented as: $E>2AP/T_p$, which represents the minimum desired time interval between two pulses. In an application using four modules 102, and a 133.3 MHz clock (wherein P=3.75 nanoseconds), then a value of $T_p$ equal to 3 microseconds yields a probability of error under one percent. In an implementation wherein each module is designed for a maximum of 80 A, and each pulse represents a current step of 2 A, then a pulse stream of 45 pulses would represent 90 A. Based on the above formula, a time period of 135 microseconds would typically be required for this data stream. Hence, with an update rate of 135 microseconds and an approximate system response time of 1.35 milliseconds, an error rate of less than ten percent would be expected. This would produce a bandwidth of approximately 2 KHz per module in accordance with the update rate presented herein, which would be acceptable for many conventional power supply applications. Of course the actual design specifications described in this example could be readily modified depending on requirements of any particular situation, and may vary widely from embodiment to embodiment.

With reference again to FIG. 1, each module determines the number of modules (M) in operation within system 100 (FIG. 1) according to any technique. In an exemplary embodiment, each module 102A–D suitably provides a predetermined number of pulses on $I_{SHARE}$ bus 106 at system startup. By monitoring the total number of pulses observed on bus 106 and dividing by the number of predetermined pulses, the total number of modules 102 present within the system 100 may be readily determined. In a further exemplary embodiment, the series of pulses may be repeated several times to compensate for unequal startup times. Each module may transmit any number of pulses within any number of successive time periods having any duration. An exemplary startup sequence, for example, may include each module transmitting forty-five pulses within ten successive intervals of 135 microseconds. During the course of the ensuing 1.3 ms period following startup, each module would transmit 450 pulses and would receive a stream of pulses that is proportional to the number of modules sharing bus 106. By simply dividing the number of pulses detected during any particular time interval by the number of pulses produced, each module suitably determines the number of modules 102 present within system 100.

Similar techniques may be used to re-calibrate the various modules 102 in the event of module failure or malfunction. In the event of a fault, each module 102 may be programmed to shut itself down to prevent damage to one or more modules 102 or to load 104. Although the current through all channels in a module is typically nominally balanced, the balance could be disturbed if one of the channels becomes defective during operation and begins to draw more current. In another scenario, if load 104 becomes short circuited, load 104 may draw excessive current from each module 102. In such cases, the system may be rapidly shut down to protect the load as well as the other channels and modules in the system.

A shut-down instruction may be conveyed to other modules 102 in system 100 via bus 106 by any technique. In an exemplary embodiment, the faulty module 102 simply provides a signal via $I_{SHARE}$ bus 106 to notify the other modules that a fault has occurred. An exemplary fault indication signal might include pulling the $I_{SHARE}$ bus 106 to a "high" or "low" logic state for a number of successive clock cycles. The module 102 could drive bus 106 to a logic "high" state for five successive clock cycles, for example, to signal the other modules 102 that a fault has occurred. The other modules 102 may then respond by decrementing the module count stored within digital controller 202 (FIG. 2A), or by shutting down the other modules 102.

Alternatively, each module 102 may sense that a fault has occurred by detecting large changes in the total or average currents reported on the $I_{SHARE}$ bus 106. In a four-module system 100, for example, a fault in one module would be expected to result in an approximately 25% drop in total current within system 100. Similarly, a fault in one module 102 in a three-module system would be expected to result in an approximately 33% drop in total current within system 100. If the module count held by each digital controller 202 is not appropriately decremented, then the average currents observed will also be affected by the shutdown of one or more modules 102. Accordingly, each digital controller 202 may be programmed to interpret a sudden drop in total current (i.e. a drop in pulse density on $I_{SHARE}$ bus 106) as a module shut-down. A pulse density drop of 25% in a four-module system, for example, could be interpreted as a module fault. In such cases, each other module 102 could compensate by decrementing a module count stored in digital controller 202, by shutting down the module 102, and/or by increasing the amount of current provided by module 102 to compensate for the disabled module 102.

Accordingly, a digital control scheme has been disclosed for use in modular power supplies. Currents flowing in each channel of the module are appropriately sensed and converted to an equivalent digital representation. The digital representation for each channel may then be processed by a controller or other device to balance the currents flowing in the various channels within the module, to implement active voltage positioning techniques, and/or to provide overload protection. Further, each module may be configured to communicate with other modules via a common bus to implement a current sharing technique. In one technique for sharing module current information, each module transmits a stream of pulses on the shared bus such that the number of pulses transmitted within a pre-determined time period is proportional to the current produced by the module. As each module transmits pulses on the bus, the total density of pulses on the shared bus becomes indicative of the total current produced by the system, and may be processed accordingly. By monitoring the number of pulses present on the bus, each module is able to determine the total and average amounts of current being provided within the power supply system. The module may then compensate its output (or the output of any particular channels) as appropriate.

Various embodiments of present invention may be described herein in terms of functional block components and various processing steps. It should be appreciated that such functional blocks may be realized by any number of hardware and/or software components configured to perform the specified functions. For example, several components may employ various integrated circuit or discrete components, e.g., memory elements, processing elements, logic elements, and the like, which may carry out a variety of functions under the control of one or more microprocessors, microcontrollers, programmable logic devices, or other control devices. Similarly, the software elements of the present invention may be implemented with any programming or scripting language such as C, C™, C++, Java, assembler, PERL or the like, with the various algorithms being implemented with any combination of data structures, objects, processes, tables, routines or other programming elements. For the sake of brevity, conventional electronics and integrated circuit techniques, as well as software development and other functional aspects of the systems (and components of the individual operating components of the systems) may not be described in detail herein. Various embodiments of the present invention could employ any number of conventional techniques for electronics configuration, signal processing, data processing and the like. Moreover, the electrical circuits disclosed herein may be readily modified in other embodiments through application general electrical and electronic principles. The voltage sources shown in FIG. 2, for example, may be readily replaced with current sources or other sources of electrical energy.

It should be appreciated that the particular implementations shown and described herein are examples of the invention and are not intended to otherwise limit the scope of the present invention in any way. The connecting lines shown in the various figures contained herein are intended to represent exemplary functional relationships and/or physical or logical couplings between the various elements. It should be noted that many alternative or additional functional relationships, physical connections or logical connections may be present in a practical power supply. The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above. No item or component is essential to the practice of the invention unless the element is specifically described herein as "essential" or "critical".

What is claimed is:

1. A method of balancing current provided by a plurality of modules coupled to a common bus, the method comprising the steps of:
   measuring a module current provided by one of said plurality of modules;
   converting said module current to a digital representation;
   transmitting said digital representation on said common bus;
   receiving signals on said common bus, wherein said signals represent currents provided by other modules coupled to said common bus; and
   adjusting the current provided by said module in response to said signals.

2. The method of claim 1 wherein said measuring step comprises measuring a plurality of channel currents, each of said plurality of channel currents corresponding to a channel of said module.

3. The method of claim 2 wherein said adjusting step comprises adjusting the channel currents provided by each of said channels.

4. The method of claim 1 further comprising the step of processing said signals to determine an average current for said plurality of modules.

5. The method of claim 4 further comprising the step of performing active voltage positioning as a function of said average current and said module current.

6. The method of claim 1 wherein said digital representation comprises a series of pulses on said shared bus.

7. The method of claim 6 wherein said digital representation is transmitted on said common bus such that the density of said pulses is indicative of said module current.

8. The method of claim 1 wherein said receiving step comprises counting said pulses on said shared bus to determine the total current supplied by said plurality of modules.

9. The method of claim 1 wherein said adjusting step comprises calculating an average current provided by said plurality of modules.

10. The method of claim 9 wherein said adjusting step further comprises performing adaptive voltage processing as a function of said average current and said module current.

11. A system for providing a balanced current to a load, the system comprising at least two modules communicating via a shared bus, wherein each of said at least two modules comprises:
    an interface to said shared bus;
    an analog-to-digital converter configured to detect the output current provided by said module and to provide a digital representation thereof; and
    a controller configured to receive said digital representation, to transmit said digital representation via said interface, to receive data via said interface indicating a total current provided by said system, and to adjust the current provided by said module in response to said total current.

12. The system of claim 11 wherein said data comprises a stream of digital pulses having a density proportional to said total current provided by said system.

13. The system of claim 12 wherein said controller further comprises a counter configured to detect said stream of digital pulses via said interface.

14. The system of claim 13 wherein said counter is an edge. triggered counter.

15. The system of claim 11 wherein said controller is further configured to provide adaptive voltage processing as a function of said digital representation and of said total current.

16. A voltage regulator module (VRM) providing an electrical output to a load, the VRM comprising:
    at least two channels, each of said channels having an electrical source switchably coupled to said electrical output;
    an analog-to-digital converter associated with each of said at least two current-providing channels, said analog-to-digital converter configured to provide a digital representation of the current provided by each of said at least two channels; and a controller configured to determine a desired output level as a function of said digital representation and of information received via a current sharing bus, wherein said controller is further configured to provide a control signal to each of said channels to adjust said electrical output to said desired output level.

17. The VRM of claim 16 wherein each of said at least two channels comprises a switch electrically coupled to said controller and receiving said control signal from said controller.

18. The VRM of claim 17 wherein said switch is a MOSFET.

19. The VRM of claim 16 wherein said controller is further configured to compute an average channel output for said at least two channels and to adjust the outputs of said at least two channels in response to said average channel output.

20. The VRM of claim 16 wherein said information comprises a digital indication of a total current provided to said load.

21. The VRM of claim 20 wherein said digital indication comprises a stream of digital pulses.

22. The VRM of claim 21 wherein a density of said pulses is proportional to said total current.

23. The VRM of claim 20 wherein said processor is further configured to provide adaptive voltage processing as a function of said digital representation and of said total current.

24. The VRM of claim 23 wherein said adaptive voltage processing is accomplished by providing a calculated offset to a voltage error signal by an amount proportional to said total current.

25. The VRM of claim 24 wherein analog-to-digital converter is configured to provide a digital representation of the voltage sensed across the output load to obtain said voltage error signal.

26. A method for controlling a plurality of channel currents provided by a voltage regulator module, the method comprising the steps of:

sampling each of the channel currents to produce a digital representation of each channel current;

determining an average channel current as a function of the digital representations;

comparing each of the digital representations to the average channel current to determine a channel deviation for each channel; and adjusting the channel currents to compensate for the channel deviations.

27. The method of claim 26 wherein the adjusting step comprises varying a duty cycle on a control signal associated with the channel current.

28. The method of claim 26 further comprising the step of disabling the channel current if the channel current exceeds a threshold current.

29. The method of claim 26 wherein the adjusting step further comprises adjusting each channel current as a function of an average module current.

30. The method of claim 29 further comprising the step of providing a digital signal on a shared bus as a function of the channel currents.

31. The method of claim 30 further comprising the step of monitoring the shared bus to receive digital signals from other voltage regulator modules to determine a system current.

32. The method of claim 31 wherein the adjusting step further comprises adjusting the channel currents as a function of the system current.

* * * * *